(12) United States Patent
Nishigori et al.

(10) Patent No.: US 11,473,268 B2
(45) Date of Patent: Oct. 18, 2022

(54) LEVER DEVICE AND WORKING MACHINE HAVING THE SAME

(71) Applicant: KUBOTA CORPORATION, Osaka (JP)

(72) Inventors: Yoichi Nishigori, Sakai (JP); Satoru Sakuraoka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 338 days.

(21) Appl. No.: 16/896,661

(22) Filed: Jun. 9, 2020

(65) Prior Publication Data

US 2020/0299931 A1 Sep. 24, 2020

Related U.S. Application Data

(63) Continuation of application No. PCT/JP2018/040816, filed on Nov. 2, 2018.

(30) Foreign Application Priority Data

Dec. 27, 2017 (JP) .............................. JP2017-250814

(51) Int. Cl.
*E02F 9/20* (2006.01)
*E02F 9/16* (2006.01)
*F16H 25/18* (2006.01)
*G05G 1/04* (2006.01)
*E02F 9/22* (2006.01)

(52) U.S. Cl.
CPC .............. *E02F 9/2004* (2013.01); *E02F 9/16* (2013.01); *F16H 25/18* (2013.01); *G05G 1/04* (2013.01); *E02F 9/2271* (2013.01)

(58) Field of Classification Search
CPC . E02F 9/16; E02F 9/166; E02F 9/2004; E02F 9/2271; F16H 25/18; G05G 1/04
See application file for complete search history.

(56) References Cited

U.S. PATENT DOCUMENTS 9,309,967 B2 * 4/2016 Iida ........................ B60K 20/04
10,407,871 B2 * 9/2019 Nishigori ................ E02F 9/221
(Continued)

FOREIGN PATENT DOCUMENTS

JP 2002-21119 A 1/2002
JP 2016-188553 A 11/2016
(Continued)

*Primary Examiner* — Tyler J Lee
(74) *Attorney, Agent, or Firm* — Birch, Stewart, Kolasch & Birch, LLP

(57) ABSTRACT

A lever device includes a base pedestal, a movable body, a lever, a cam body having a cam groove, a guide pin, and a first biasing member. The lever is configured to swing between a push-down position at which the guide pin is arranged in the upper groove portion and a pull-up position at which the guide pin is arranged in the lower groove portion. The first biasing member has one end connected to a first connector portion provided on the base pedestal; and the other end connected to a second connector portion provided on the cam body, is arranged behind the second lateral shaft when the lever is located at the push-down position, and is arranged in front of the second lateral shaft when the lever is located at the pull-up position.

9 Claims, 16 Drawing Sheets

(56) References Cited

U.S. PATENT DOCUMENTS

| | | | |
|---|---|---|---|
| 2015/0130219 A1* | 5/2015 | Uchida | E02F 9/0858 |
| | | | 296/190.01 |
| 2015/0260283 A1* | 9/2015 | Iida | F16H 59/06 |
| | | | 74/473.17 |
| 2017/0285681 A1 | 10/2017 | Nishigori et al. | |

FOREIGN PATENT DOCUMENTS

| | | | |
|---|---|---|---|
| JP | 2017-48522 A | 3/2017 | |
| WO | WO 2016/157659 A1 | 10/2016 | |

* cited by examiner

LEVER DEVICE AND WORKING MACHINE HAVING THE SAME

CROSS-REFERENCE TO RELATED APPLICATIONS

The present application is a continuation application of International Application No. PCT/JP 2018/040816, filed Nov. 2, 2018, which claims priority to Japanese Patent Application No. 2017/250814, filed Dec. 27, 2017. The contents of these applications are incorporated herein by reference in their entirety.

BACKGROUND OF THE INVENTION

Field of the Invention

The present invention relates to a working machine having a lever device and a working machine having the lever device.

Description of Related Art

As a working machine provided with a lever device such as an unload lever device, the working machine disclosed in Japanese Unexamined Patent Publication No. 2017-48522 is previously known.

Japanese Unexamined Patent Publication No. 2017-48522 discloses a technique for configuring a guide pin provided on the unload lever to engage with a guide groove provided on a support bracket under the state where the unload lever is pulled up (an unloading state), so that it is prevented from shifting to a loading state against the operator's intention when the operator pushes down a portion (the operation lever or the like) other than the unload lever.

SUMMARY OF THE INVENTION

A lever device according to one aspect of the present invention includes: a base pedestal; a movable body pivotally supported by the base pedestal to be rotatable about a first lateral shaft; a lever supported by the movable body to be swingable; a cam body having a cam groove, pivotally supported by the movable body to be rotatable about a second lateral shaft and configured to rotate about the second lateral shaft according to swinging of the lever; a guide pin provided on the base pedestal and inserted to the cam groove; and a first biasing member configured to press the cam body in a direction to rotate the cam body about the second lateral shaft. The cam groove includes: an intermediate groove portion curved to be convex in a direction separating from the first lateral shaft; an upper groove portion communicated with an upper end portion of the intermediate groove portion and curved in the direction separating from the first lateral shaft; and a lower groove portion communicated with a lower end portion of the intermediate groove portion and curved in the direction approaching the first lateral shaft. The lever is configured to swing between: a push-down position at which the guide pin is arranged in the upper groove portion; and a pull-up position at which the guide pin is arranged in the lower groove portion. The cam groove is provided in the cam body in front of the second lateral shaft. The first biasing member has: one end connected to a first connector portion provided on the base pedestal; and the other end connected to a second connector portion provided on the cam body, is arranged behind the second lateral shaft when the lever is located at the push-down position, and is arranged in front of the second lateral shaft when the lever is located at the pull-up position.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
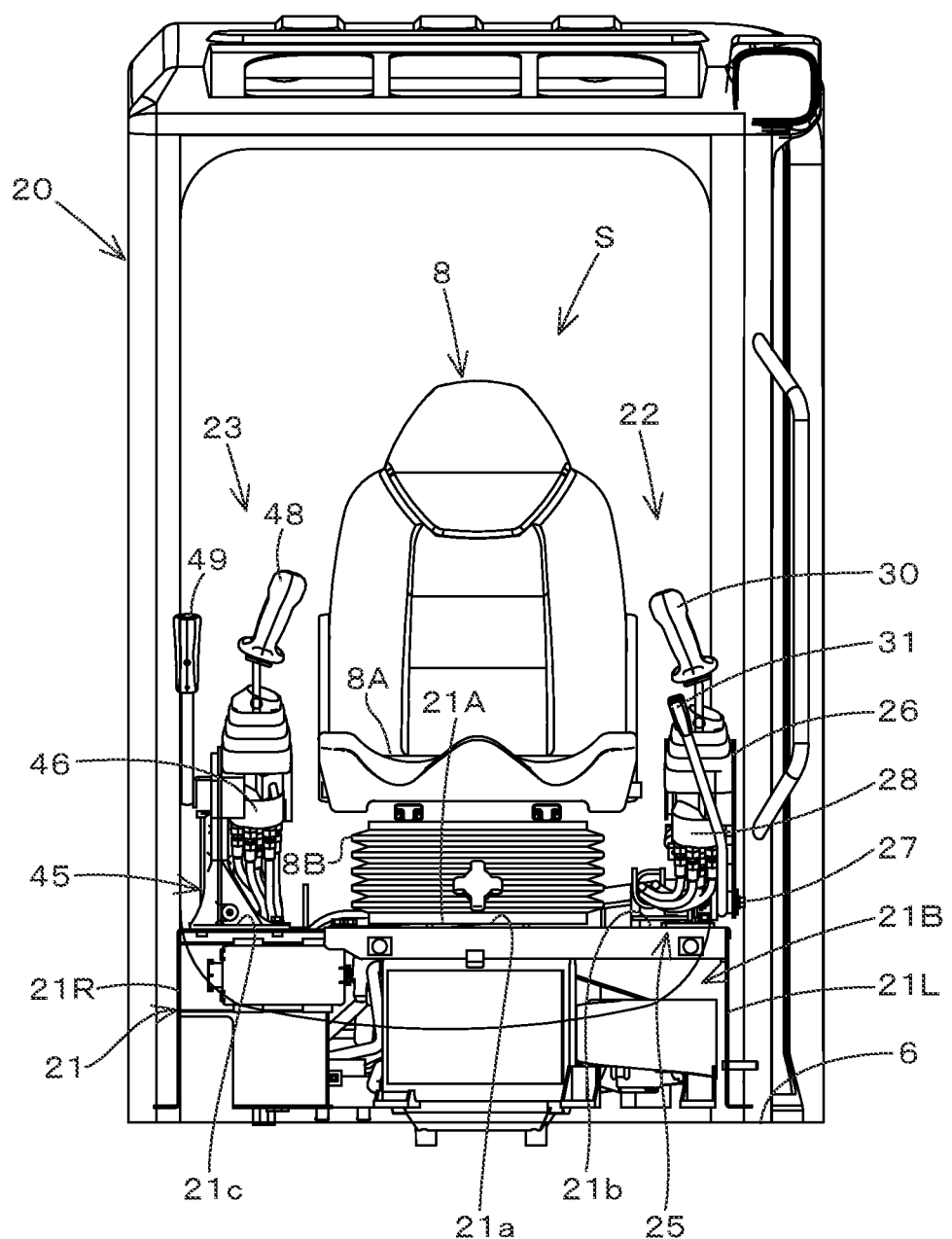
FIG. 1 is a front view illustrating a structure of an operating portion of a working machine according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

Figure 15:
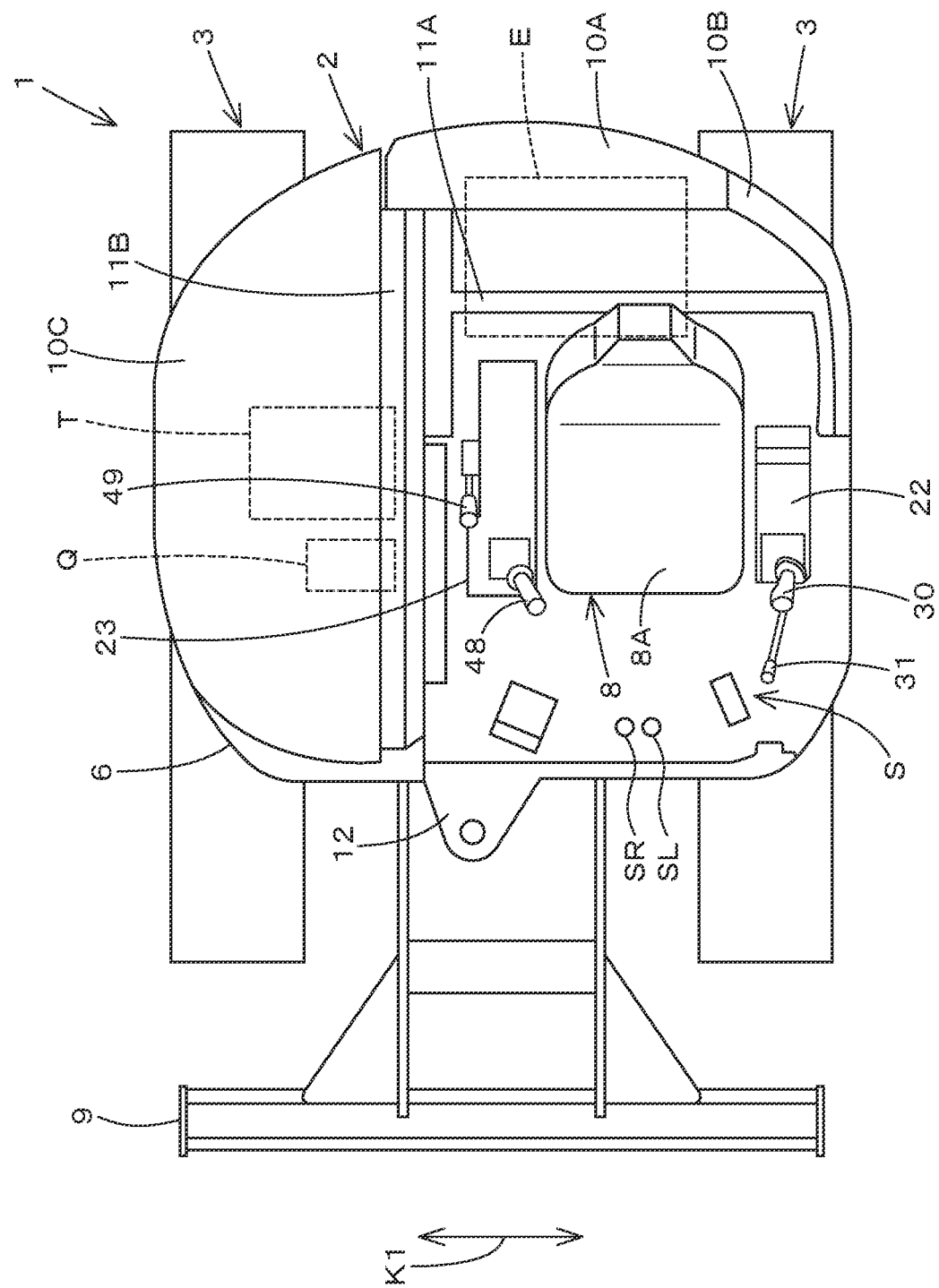
FIG. 15 is a plan view of the working machine according to the embodiment.
Figure 16:
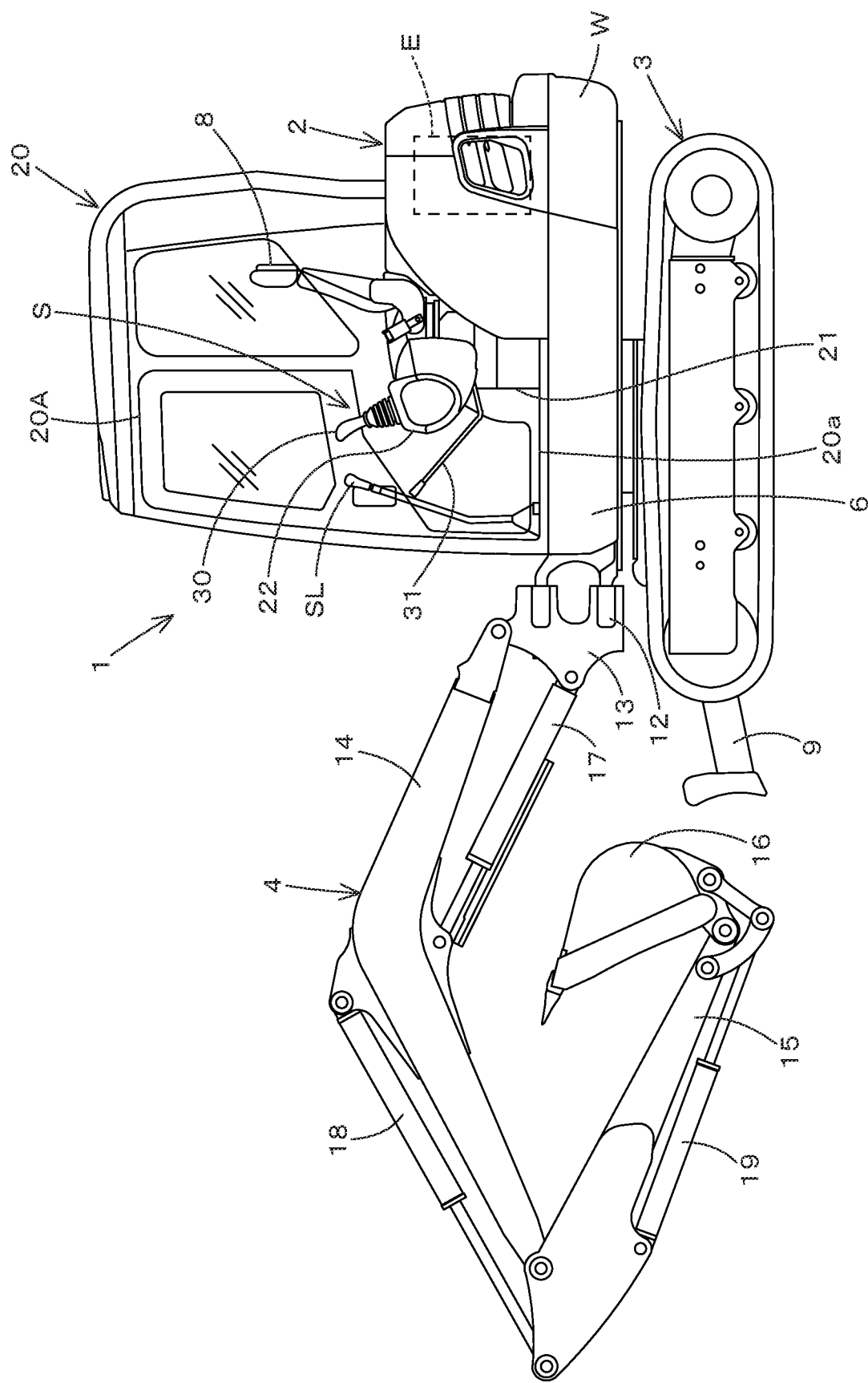
FIG. 16 is a side view of the working machine according to the embodiment.

FIG. 15 and FIG. 16 show the working machine 1 according to the present embodiment. In the present embodiment, a backhoe, which is a swiveling working machine, is shown as the working machine 1.

The working machine 1 includes a machine body (a vehicle body) 2, a traveling device 3, and a working device 4.

A operator seat 8 is provided on the machine body 2. Hereinafter, in the description of the embodiment, the front side of the operator sifting on the operator seat 8 (the left side in FIG. 16) is referred to as the front, the rear side of the operator (the right side in FIG. 16) is referred to as the rear, the left side of the operator (the front surface side in FIG. 16) is referred to as the left, and the right side of the operator (the back surface side in FIG. 16) is referred to as the right. In addition, the horizontal direction K1 (see FIG. 15), which is a direction orthogonal to the front-rear direction, will be described as the machine width direction.

The machine body 2 has a turn base 6 supported on the frame of the traveling device 3. The turn base 6 is supported above the traveling device 3 via a bearing so as to be freely turned around a vertical axis by a driving force of a turn motor (not shown in the drawings). As shown in FIG. 16, the working device 4 is attached to the front portion of the turn base 6. A cabin 20 is mounted on the turn base 6. Note that the working device 4 and the cabin 20 are omitted in FIG. 15. The operator seat 8 is provided inside the cabin 20. A boarding gate 20a is provided on the left side of the cabin 20, that is, the left of the operator seat 8. A door 20A is provided at the boarding gate 20a.

An engine room is provided at the rear portion of the turn base 6. An engine E, a hydraulic pump (not shown in the drawings) and the like are arranged in the engine room. The front side of the engine room is separated from the operator seat 8 by a partition wall 11A. The rear side of the engine room is covered with a rear bonnet 10A. The left side of the engine room is covered with a left cover body 10B.

A tank room is provided to the right portion on the turn base 6. A operation fluid tank T, a control valve Q, and the like are arranged in the tank room. The left side of the tank room is separated from the operator seat 8 by a partition wall 11B. The upper side, the front side, and the right side of the tank room are covered with a right cover body 10C.

As shown in FIG. 16, the working device 4 is attached to the front portion of the turn base 6 by an attachment bracket 12 and a swing bracket 13. The attachment bracket 12 is fixed to the front portion of the turn base 6. The swing bracket 13 is supported by the attachment bracket 12 so as to be swingable around an axis extending in a vertical direction. The swing bracket 13 is swung rightward and leftward by a hydraulic swing cylinder. A counterweight W for balancing the weight of the working device 4 is mounted at the rear portion of the turn base 6.

The traveling device 3 is a crawler type traveling device, and is provided below the right side and the left side of the machine body 2, respectively. The traveling device 3 is driven by a hydraulic traveling motor. A dozer 9 is provided to the front portion of the traveling device 3. The dozer 9 is swung upward and downward by a dozer cylinder constituted of a hydraulic cylinder.

The working device 4 has a boom 14, an arm 15, and a working tool 16. The working device 4 includes a boom cylinder 17, an arm cylinder 18, and a working tool cylinder 19 as the driving mechanisms (the hydraulic actuators) for the boom 14 and the like. The boom cylinder 17, the arm cylinder 18, and the working tool cylinder 19 are constituted of double-acting hydraulic cylinders.

The boom 14 is supported by the swing bracket 13 so as to be swingable in a vertical direction. The arm 15 has a base portion supported by the tip end side of the boom 14 so as to be swingable in the vertical direction. The bucket as the working tool 16 is attached to the tip end side of the arm 15 so as to be capable of performing the squeezing operation and the dumping operation.

Figure 3:
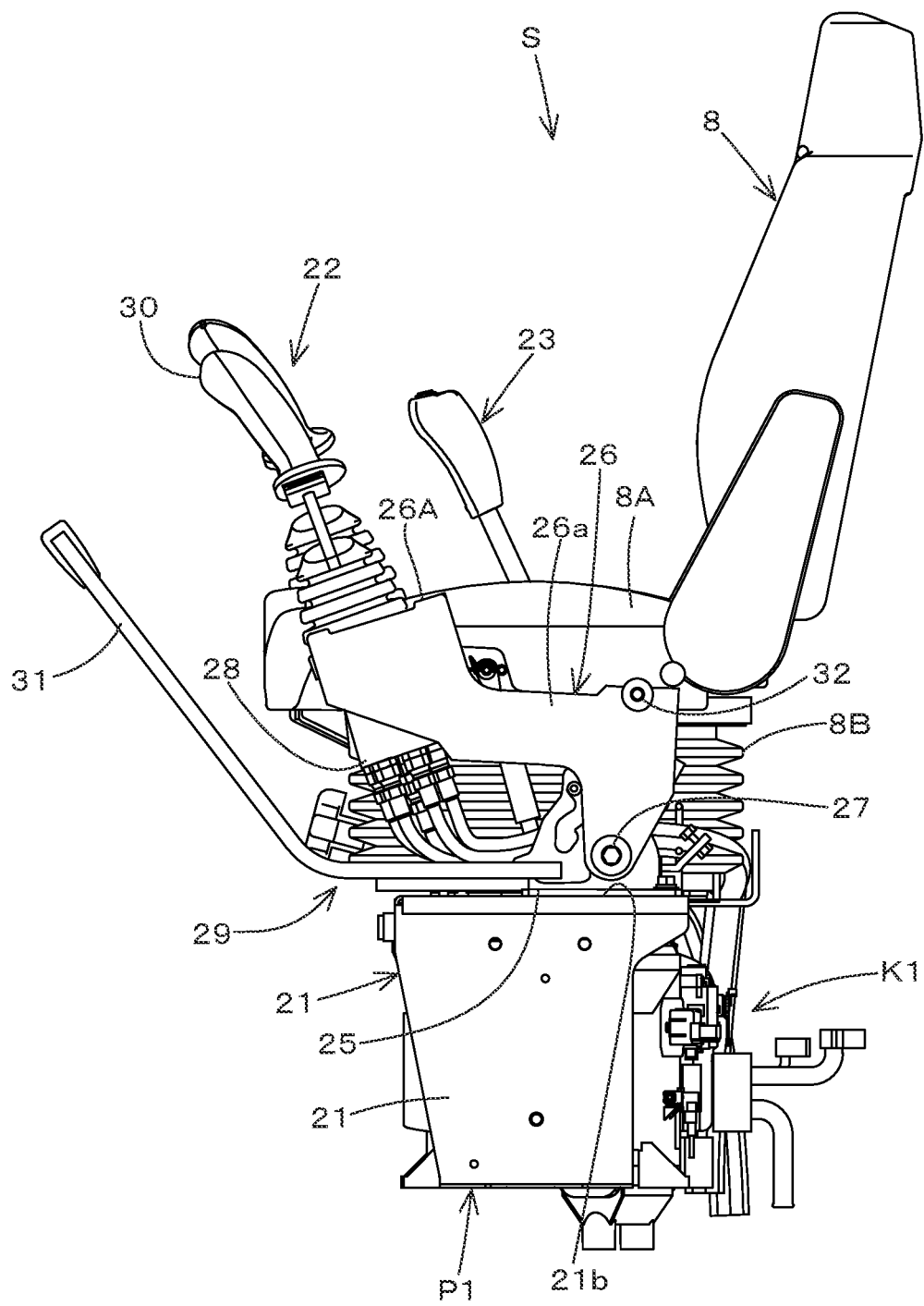
FIG. 3 is a left side view illustrating the structure of the operating portion of the working machine according to the embodiment.

A control portion S is provided on the turn base 6. As shown in FIG. 15, the control portion S is separated from the engine room by a partition wall 11A, and is separated from the tank room by a partition wall 11B. An operator seat 8 is provided in the control portion S. As shown in FIG. 1 and FIG. 3, the operator seat 8 includes a seat 8A that serves as a seating surface and includes a suspension 8B provided below the seat 8A. As shown in FIG. 15, a left traveling operation lever SL and a right traveling operation lever SR are arranged in front of the operator seat 8. The traveling device 3 provided to the left and the traveling device 3 provided to the right can be operated separately or simultaneously through the operation of the left traveling operation lever SL and the right traveling operation lever SR. Pedals and the like are arranged near the right foot and the left foot of the operator seat 8.

Figure 2:
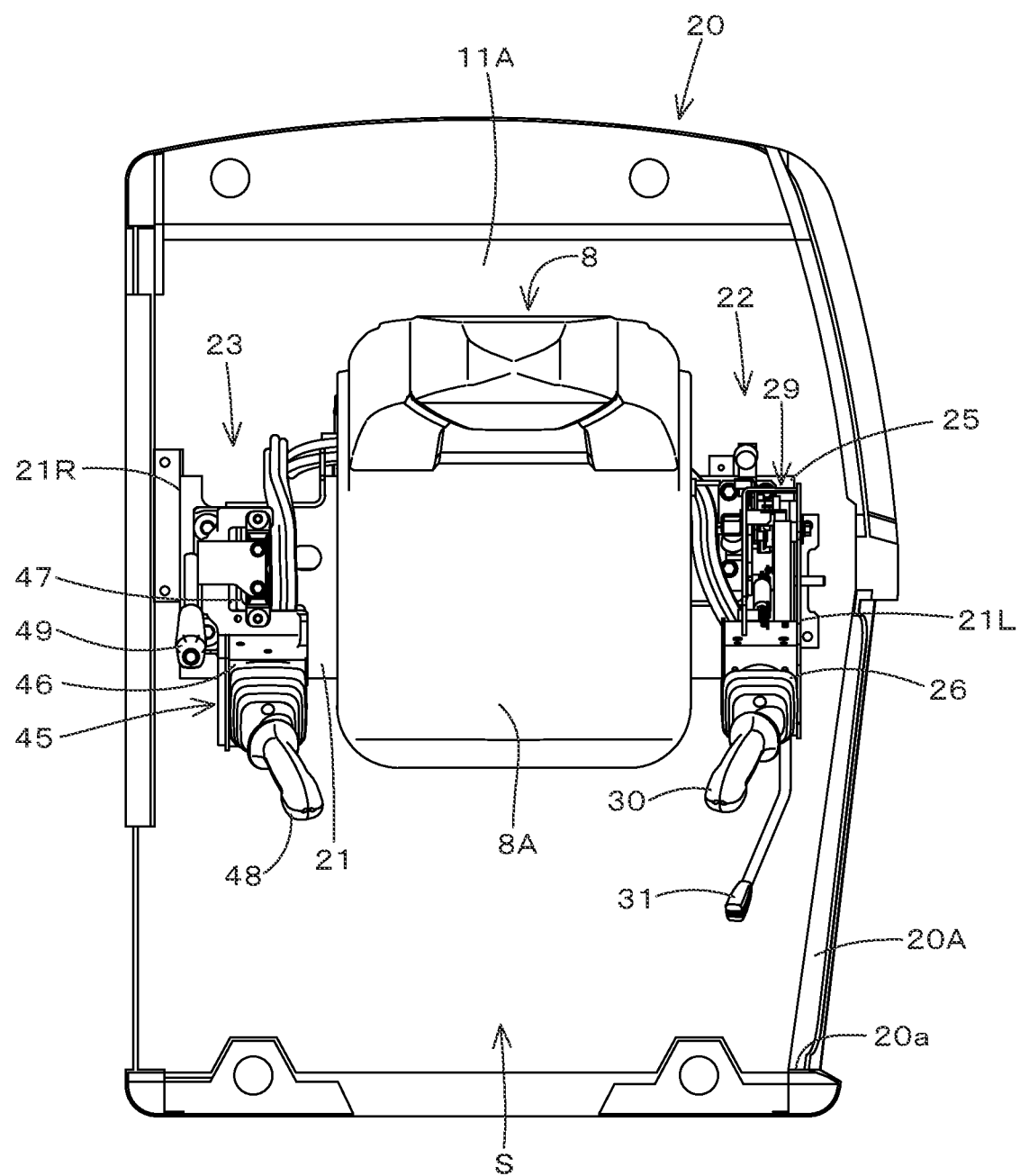
FIG. 2 is a plan view illustrating the structure of the operating portion of the working machine according to the embodiment.

As shown in FIG. 1, an control dashboard 21 is provided below the operator seat 8. As shown in FIG. 1 and FIG. 2, and the like, a left control device 22 and a right control device 23 are mounted on the control dashboard 21. The left control device 22 is provided on the left side of the operator seat 8. The right control device 23 is provided on the right side of the operator seat 8.

As shown in FIG. 1, the control dashboard 21 has an upper surface portion 21A substantially flat, a left leg portion 21L, and a right leg portion 21R. A housing space 21B is formed below the upper surface portion 21A. An air conditioner device and the like are housed in the housing space 21B. Mounting-base portions 21a, 21b, and 21c are formed on the upper surface portion 21A. The operator seat 8 is mounted on the mounting-base portion 21a. The left control device 22 is mounted on the mounting-base portion 21b. The right control device 23 is mounted on the mounting-base portion 21c.

As shown in FIG. 1 and FIG. 2, the right control device 23 has a control bracket 45. The control bracket 45 is provided with a right control valve 46 and a dozer operation valve 47. The control bracket 45 is fixed to the upper portion of the mounting-base portion 21c of the control dashboard 21 by bolts.

The right control valve 46 can be operated by the right operation lever 48. The dozer operation valve 47 can be operated by a dozer operation lever 49. The right control valve 46 is a pilot valve for the boom 14 and the working tool 16, and is configured to control the control valve for the boom cylinder 17 and the working tool cylinder 19 with the right operation lever 48. The dozer operation valve 47 is a pilot valve for driving the dozer 9, and is configured to control the control valve for the dozer cylinder with the dozer operation lever 49.

The configurations of the control dashboard 21 and the right control device 23 are not limited to the configurations illustrated in the drawings.

As shown in FIG. 3 to FIG. 6 and FIG. 8 to FIG. 11, the left control device 22 has a movable body 26, a cam body 33, and a lever 31.

The left control device 22 is a lever device of this embodiment. Specifically in the present embodiment, the lever 31 is an unload lever configured to switch the hydraulic actuator of the working machine 1 between an operable state and an inoperable state, and the lever device is an unload lever device including the unload lever. Thus, hereinafter, the lever device will be described as the unload lever device and the lever 31 will be described as the unload lever. However, the lever device is not limited to the unload lever device, and the lever 31 is not limited to the unload lever.

The movable body 26 is pivotally supported so as to be rotatable about an axis extending in the machine width direction with respect to the base pedestal 25. In the case of this embodiment, the movable body 26 is a control box, and the base pedestal 25 is a support bracket. Thus, in the following description, the movable body 26 is a control box, and the base pedestal 25 is a support bracket. However, the movable body 26 is not limited to the control box, and the base pedestal 25 is not limited to the support bracket.

Figure 5:
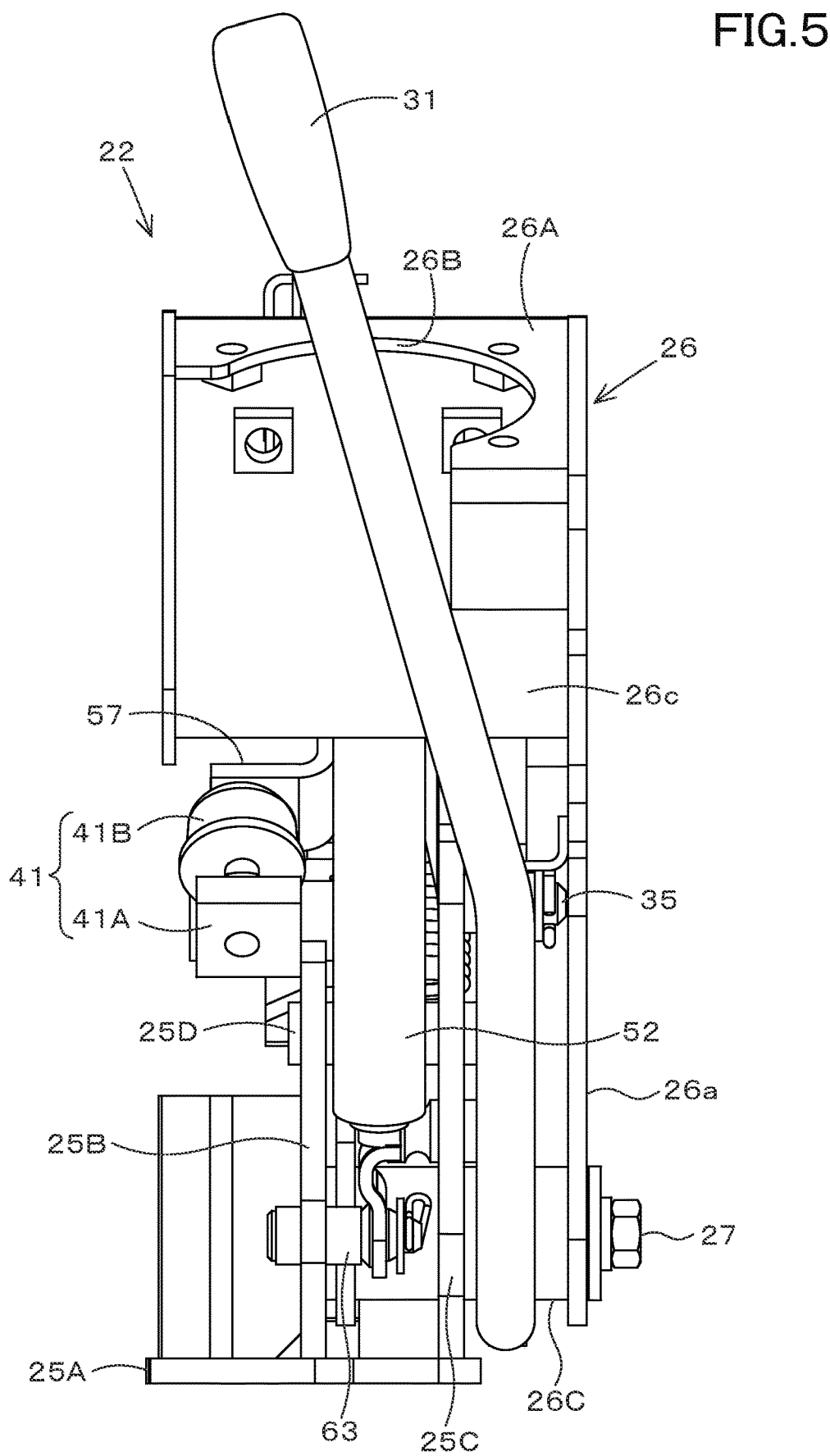
FIG. 5 is a front view of the left operation device according to the embodiment.
Figure 6:
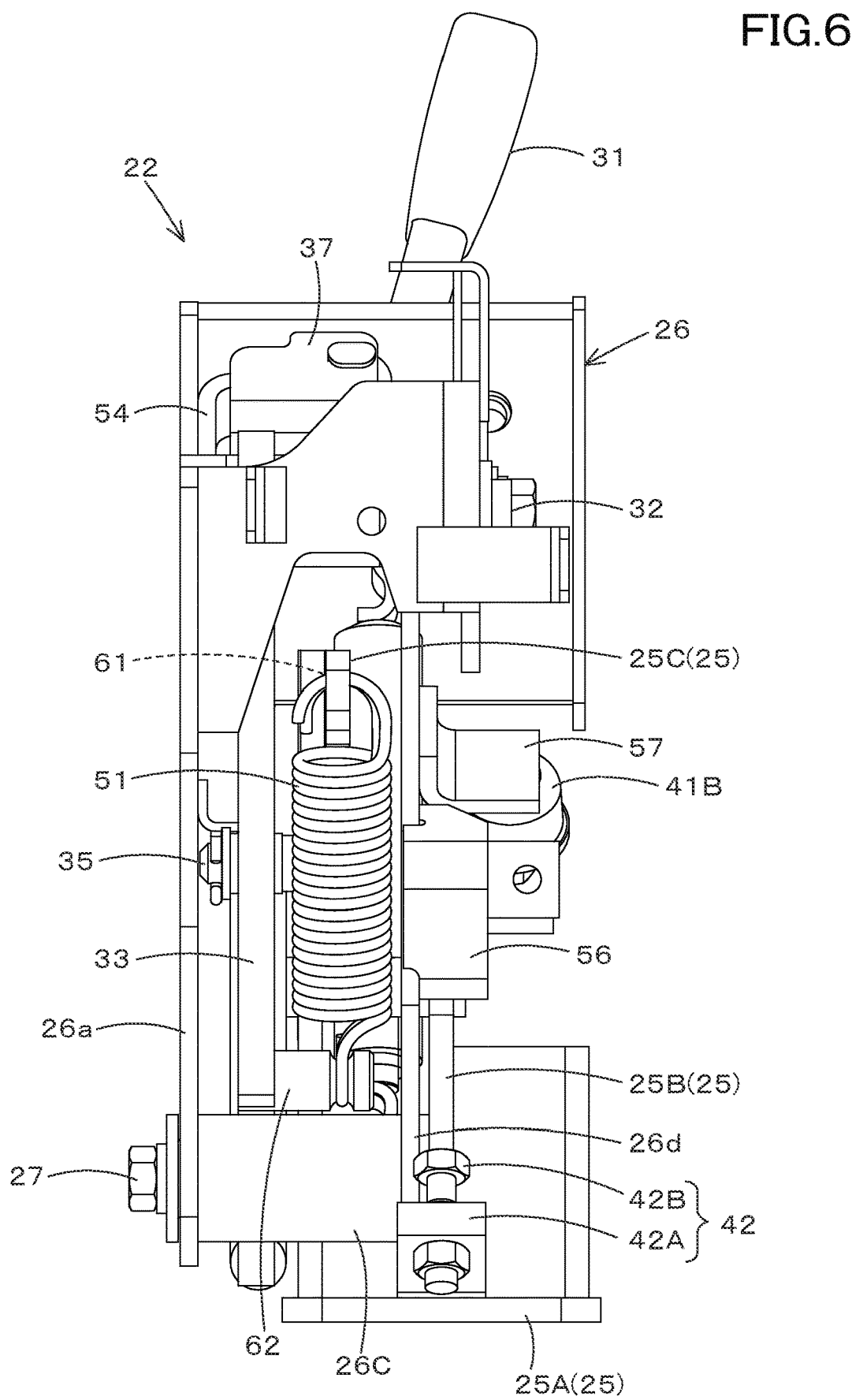
FIG. 6 is a back view of the left operation device according to the embodiment.
Figure 7:
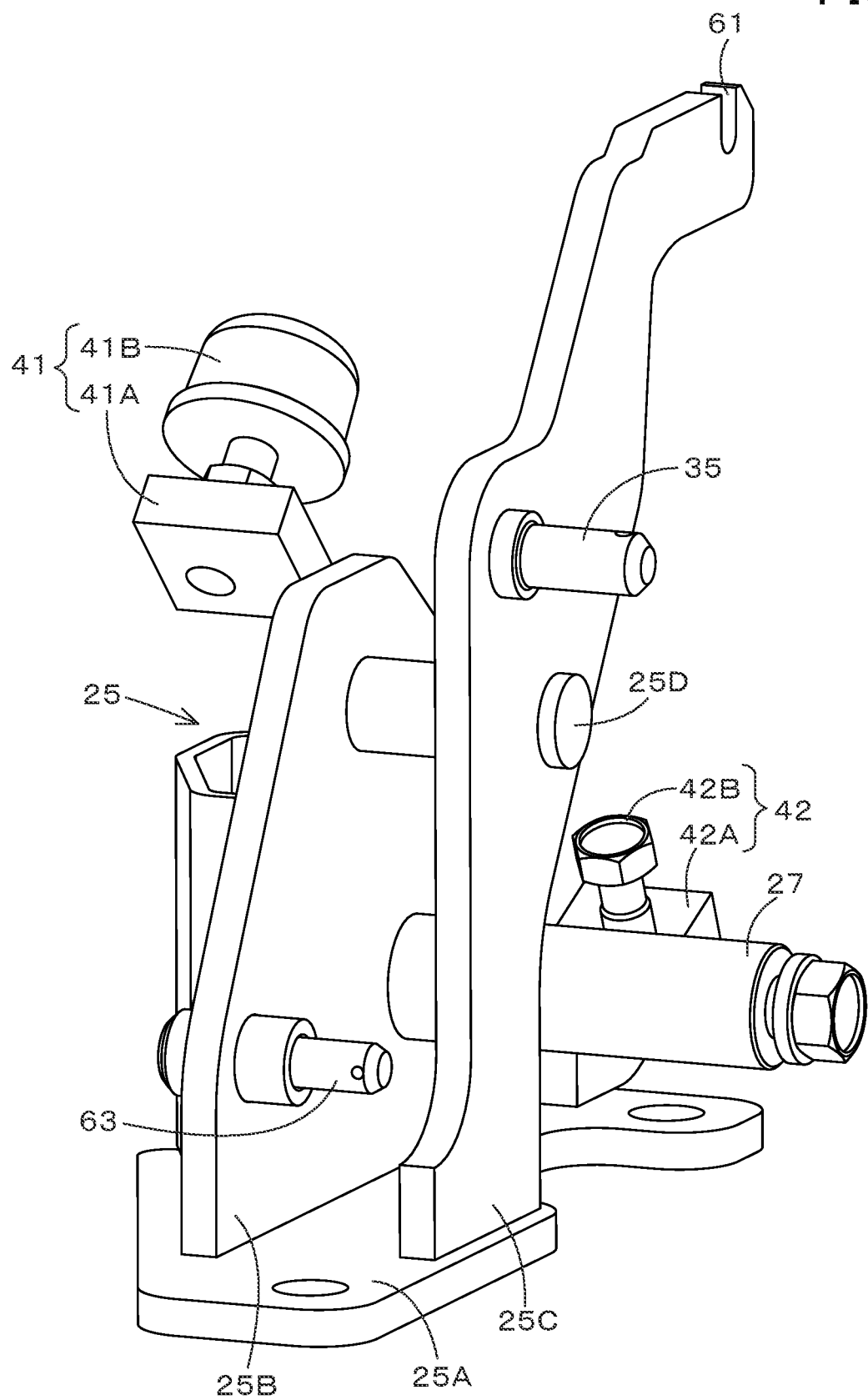
FIG. 7 is a perspective view of a support bracket according to the embodiment.

As shown in FIG. 5 to FIG. 7, the support bracket (the base pedestal) 25 includes a plate-shaped attachment portion 25A arranged horizontally, and includes a first support portion 25B and a second support portion 25C both raised from the upper surface of the attachment portion 25A. The attachment portion 25A is fixed to the upper surface portion 21A of the control dashboard 21 by bolts or the like. The first support portion 25B and the second support portion 25C are arranged side by side with an interval in the machine width direction. The first support portion 25B is arranged on an inner side in the machine width direction, and the second support portion 25C is arranged on an outer side in the machine width direction. The first support portion 25B and the second support portion 25C are connected by a connector shaft 25D extending in the machine width direction.

Figure 4:
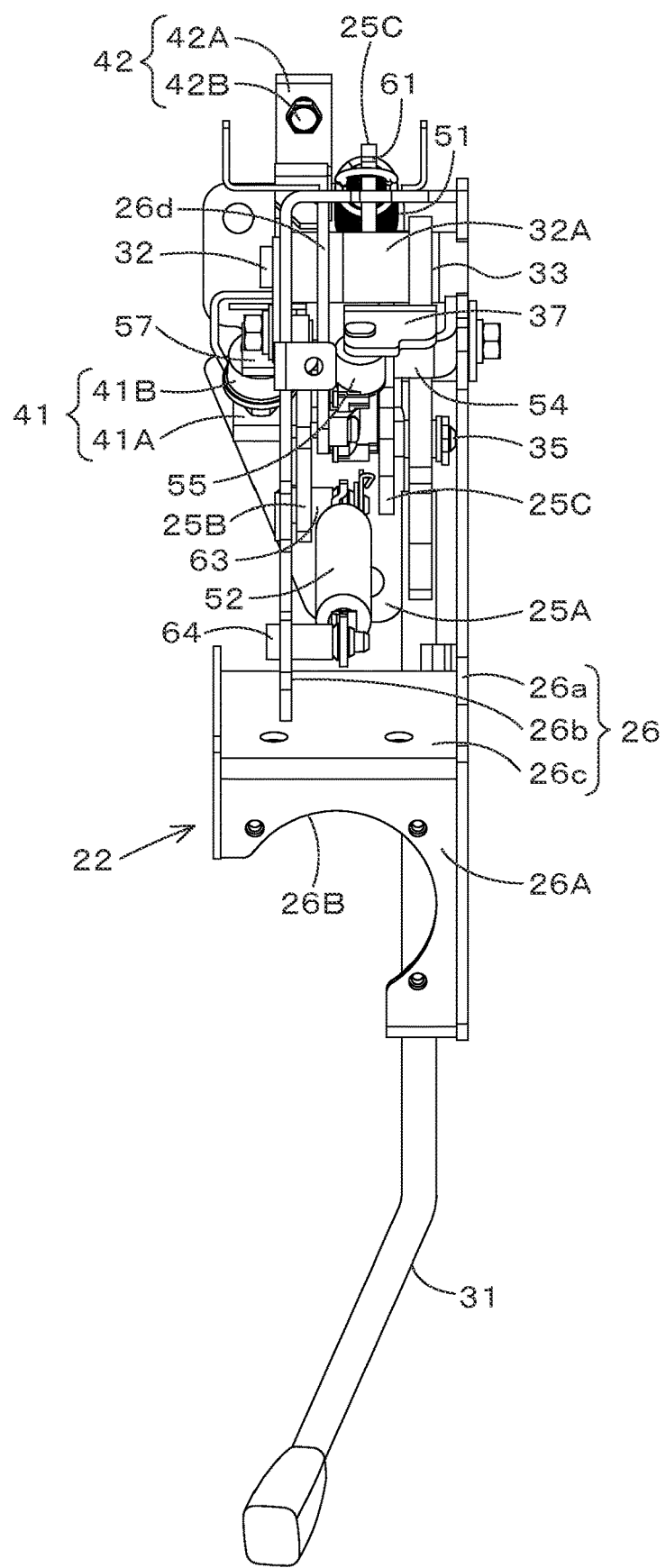
FIG. 4 is a plan view of a left operation device according to the embodiment.
Figure 8:
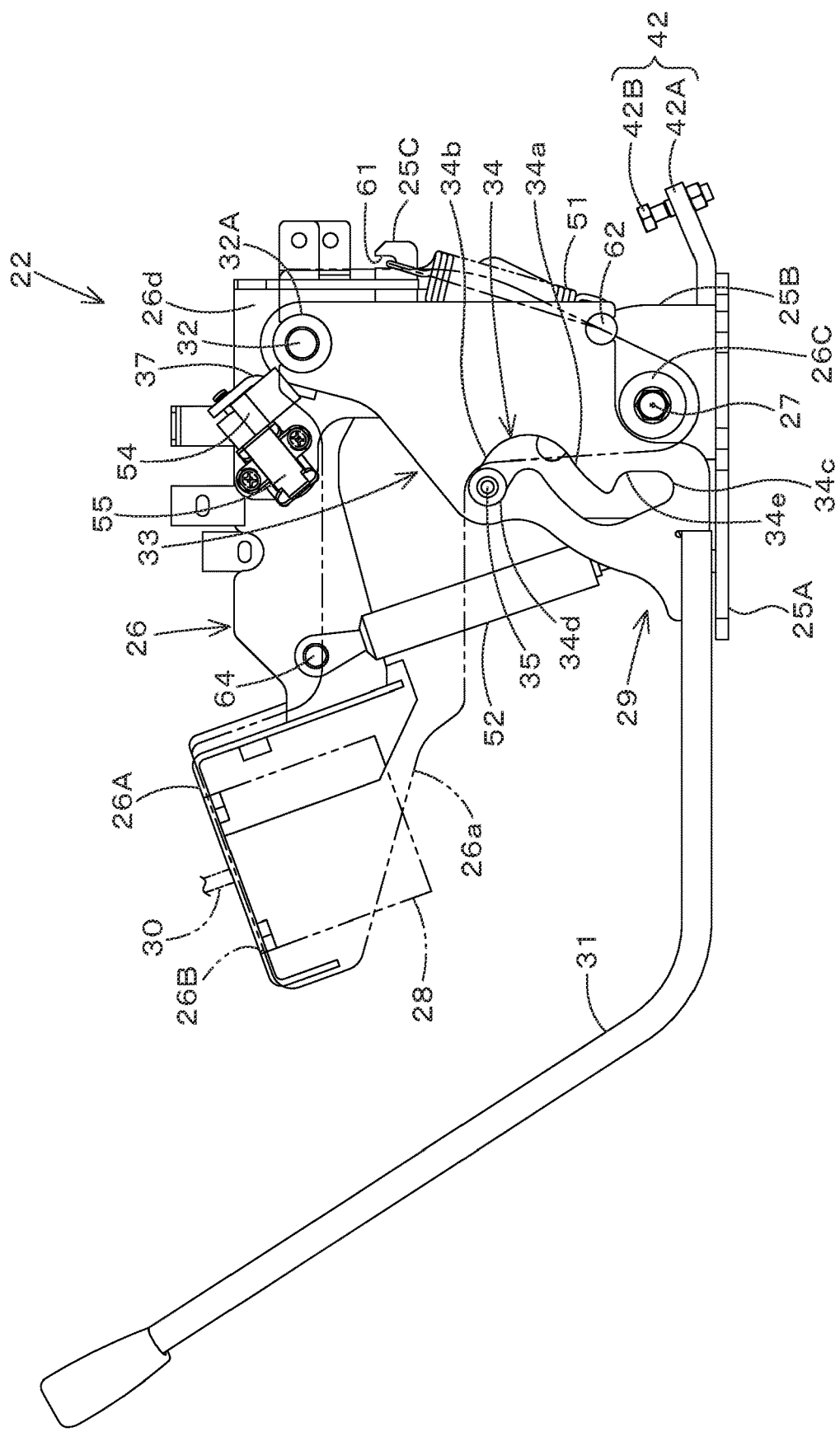
FIG. 8 is a left side view illustrating an inner structure of the left operation device according to the embodiment.
Figure 9:
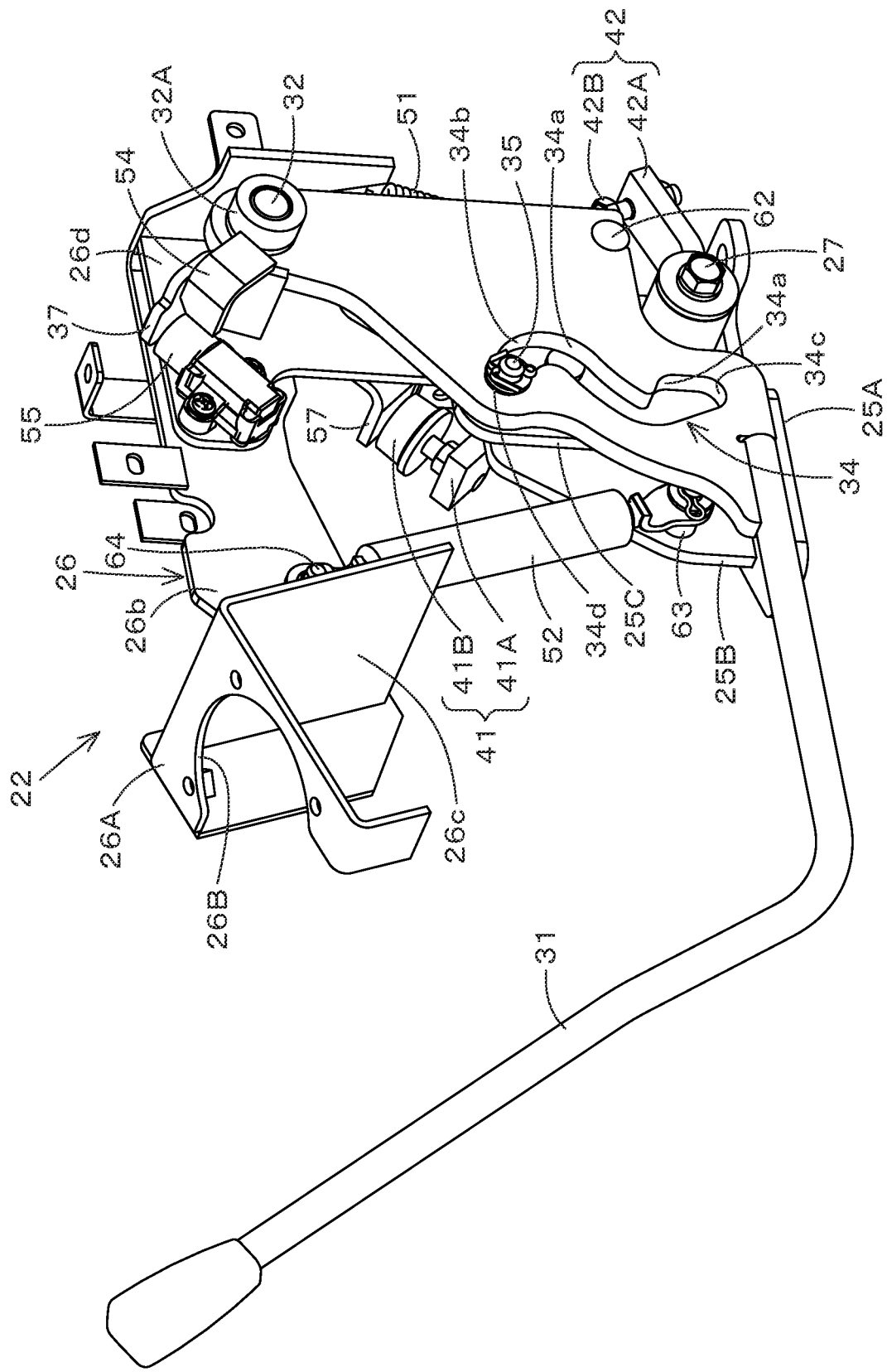
FIG. 9 is a left perspective view illustrating the inner structure of the left operation device according to the embodiment.
Figure 10:
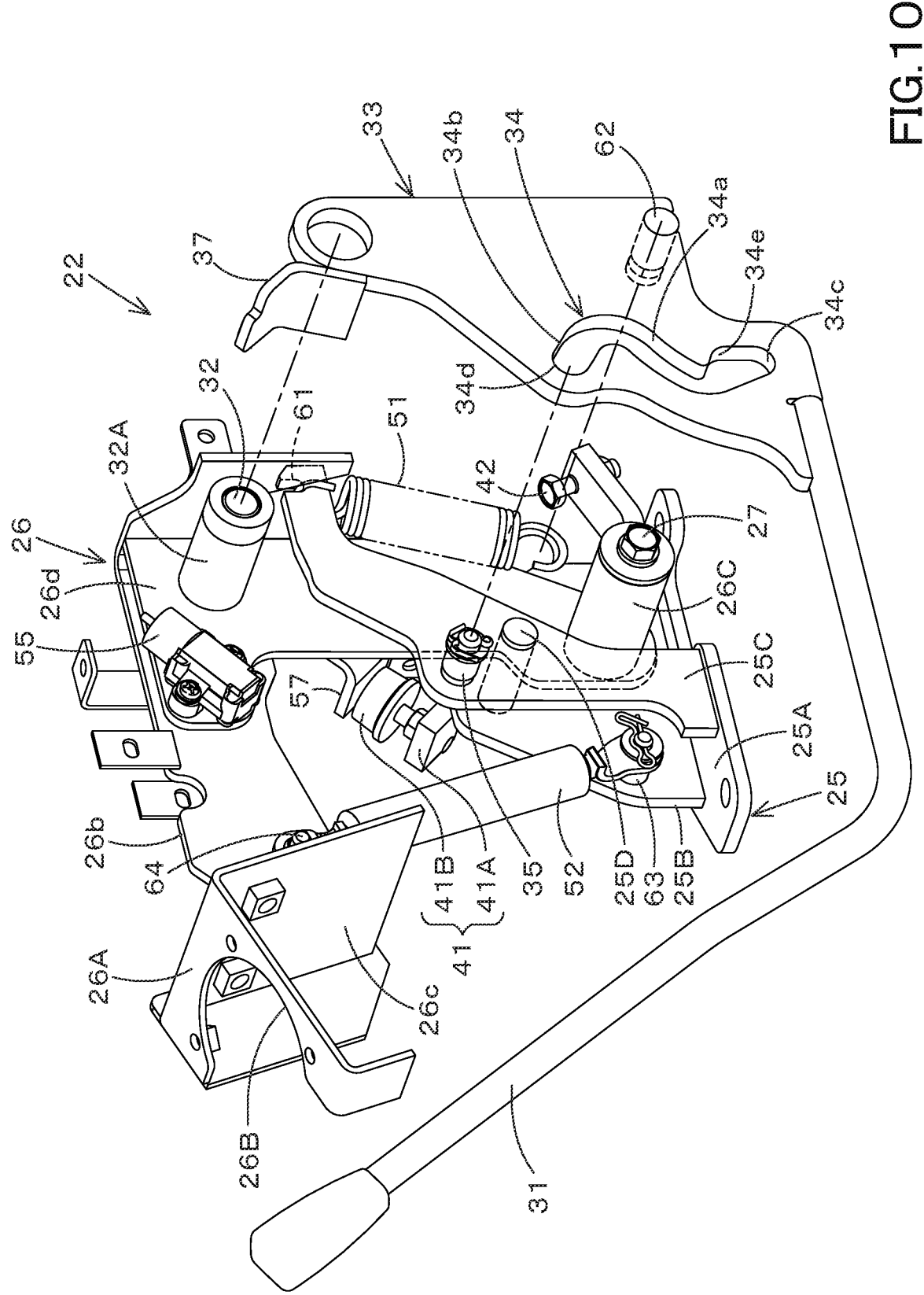
FIG. 10 is an exploded perspective view illustrating the inner structure of the left operation device according to the embodiment.
Figure 11:
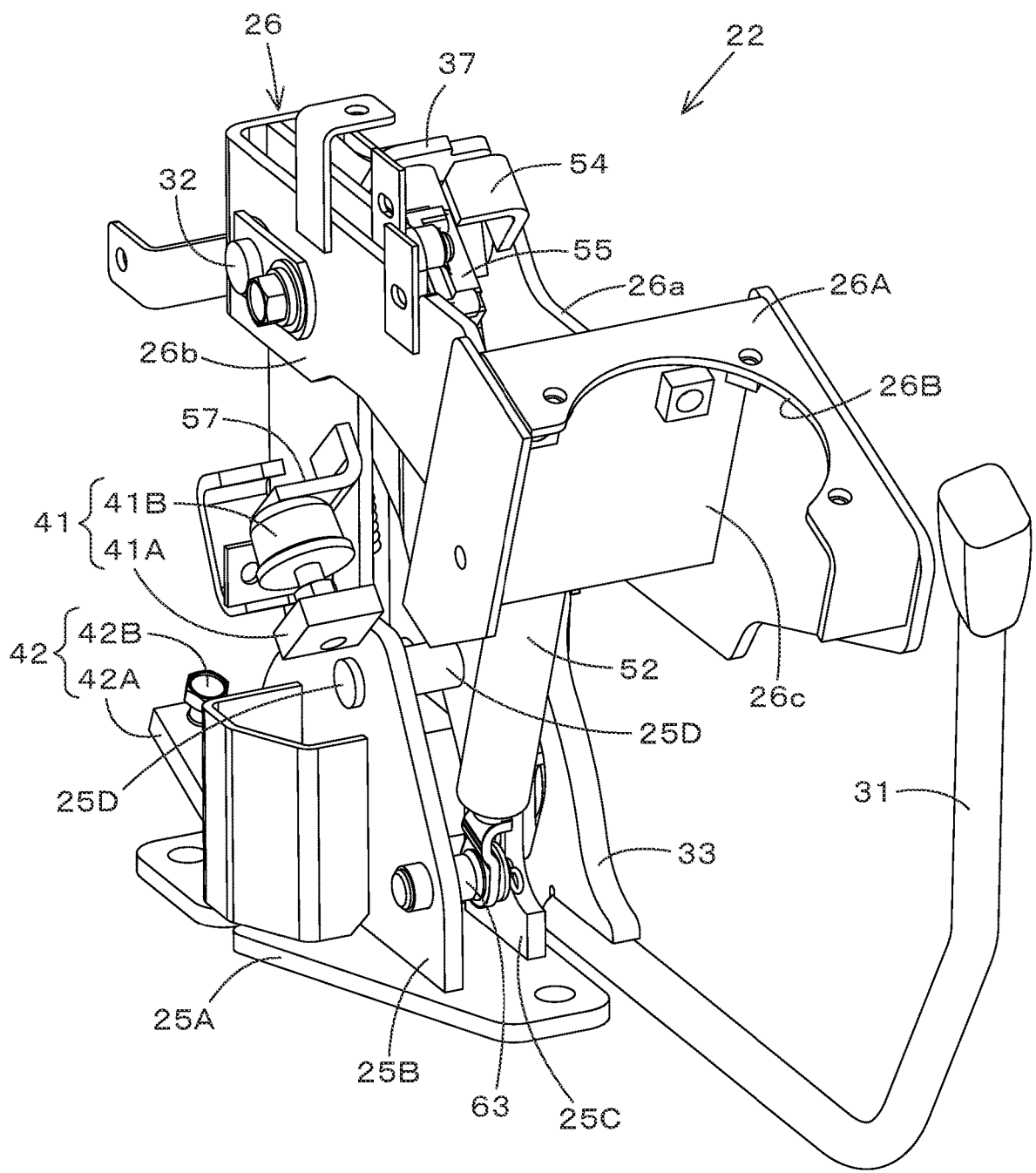
FIG. 11 is a right perspective view of the left operation device according to the embodiment.

The control box (the movable body) 26 has a left plate member 26a, a right plate member 26b, an attachment plate 26c, and a bearing plate 26d, and is formed in a box shape. As shown in FIG. 3 to FIG. 6 and FIG. 11, and the like, the left plate member 26a forms a left side wall of the control box 26. For convenience of the description, the left plate member 26a is shown by an imaginary line (a two-dot chain line) in FIG. 8 and FIG. 12 to FIG. 14, and the left plate member 26a is omitted in FIG. 9 and FIG. 10. As shown in FIG. 9 to FIG. 11, the right plate member 26b forms the right side wall and the back wall of the control box 26. The rear portion of the left plate member 26a and the back wall of the right plate member 26b are fixed to each other. As shown in FIG. 4 and the like, the attachment plate 26c is fixed so as to connect the front portion of the left plate member 26a and the front portion of the right plate member 26b. The clearance between the left plate member 26a and the right plate member 26b is smaller than the width (a length in the machine width direction) of the attachment plate 26c. As shown in FIG. 9 and FIG. 10, the bearing plate 26d is fixed to the inner surface (a front surface) of the back wall of the right plate member 26b. The left surface of the bearing plate 26d is opposed to the inner surface (a right surface) of the left plate member 26a.

As shown in FIG. 4 and FIG. 5, an attachment portion 26A of the left control valve 28 is formed on the upper portion of the attachment plate 26c of the control box 26. As shown in FIG. 3, the left control valve 28 is attached to the attachment portion 26A. The attachment portion 26A has a substantially semicircular opening 26B whose right front portion is opened. In this manner, the left control valve 28 can be attached to the opening 26B of the attachment portion 26A from the front right side, that is, the operator seat 8 side. The left control valve 28 is a pilot valve for the turning and the arm operation, and is operated by a left operation lever 30. The left operation lever 30 is attached to the upper portion of the attachment portion 26A of the control box 26.

As shown in FIG. 7 and the like, the first support portion 25B of the support bracket 25 is provided with a first lateral shaft 27 extending in the horizontal direction (in the machine width direction). As shown in FIG. 10 and the like, a boss portion 26C is fitted on the outer periphery of the first lateral shaft 27 so as to be rotatable around the first lateral shaft 27. As shown in FIG. 6 and the like, the boss portion 26C extends in the lateral direction (in the machine width direction) so as to connect the left plate member 26a of the control box 26 and the bearing plate 26d. In this manner, the control box 26 is supported by the support bracket 25 so as to be rotatable (around the first lateral shaft 27) about the first lateral shaft 27 serving as a fulcrum. As shown in FIG. 8, the boss portion 26C is provided in the lower rear portion of the control box 26.

As shown in FIG. 7 and the like, the second support portion 25C of the support bracket 25 is provided with a guide pin 35 having a shaft axis extending in the machine width direction. The guide pin 35 extends in the direction (leftward) same as the direction of the first lateral axis 27 and in parallel with the first lateral axis 27. As shown in FIG. 8, the guide pin 35 is located on the upper front side of the first lateral shaft 27.

As shown in FIG. 4 and FIG. 8 to FIG. 11, a second lateral shaft 32 extending in the lateral direction (in the machine width direction) is provided at the rear portion of the control box 26. The second lateral shaft 32 is located above and rearward of the first lateral axis 27, and is parallel to the first lateral axis 27. As shown in FIG. 8, the guide pin 35 is located at an intermediate height between the first lateral shaft 27 and the second lateral shaft 32. As shown in FIG. 4 and FIG. 8 to FIG. 10, the cam body 33 is supported on the rear portion of the control box 26 by the second lateral shaft 32. As shown in FIG. 9, FIG. 10, and the like, the boss portion 32A is fitted on the outer periphery of the second lateral shaft 32 so as to be rotatable around the second lateral shaft 32, the base portion (an rear upper portion) of the cam body 33 is fixed to the boss portion 32A. In this manner, the cam body 33 is rotatable about the second lateral shaft 32.

The cam body 33 is arranged between the second support portion 25C of the support bracket 25 and the left plate member 26a of the control box 26. The cam body 33 has a flat plate shape, and the cam body 33 is rotatably supported by the second lateral shaft 32 at the portion near the upper end portion, and extends (expands) downward and forward from the second lateral shaft 32 under the state where the unload lever 31 is positioned at the push-down position (see FIG. 8). The base portion (the rear portion) of the unload lever 31 is fixed to the lower front portion of the cam body 33.

The unload lever 31 is swingably supported by the control box 26 with the cam body 33, and is swingable around the second lateral shaft 32. When the unload lever 31 is swung, all of the hydraulic actuators of the working machine 1 (the boom cylinder 17, the arm cylinder 18, the working tool cylinder 19, the swing cylinder, the dozer cylinder, the traveling motor, the turn motor, and the hydraulic actuator and the like to be attached to/detached from the service port) can be operated as to whether or not to supply the operation fluid. However, the unload lever 31 may be operated as to whether or not to supply the operation fluid to only a part of the hydraulic actuators of the working machine 1 (for example, the hydraulic actuators of the working device 4) through the swinging of the unload lever 31.

As shown in FIGS. 8 to 10, the cam body 33 has a cam groove 34 formed in a substantially Z-shape from one end side (the second lateral shaft 32 side) toward the other end side (the unload lever 31 side). The cam groove 34 is provided at a position in front of the second lateral shaft 32 (on the unload lever 31 side) in the cam body 33. The guide pin 35 is inserted into the cam groove 34 though a cam follower.

The cam groove 34 is formed in such a length that the control box 26 can be rotated by a required angle (for example, about 50°). The cam groove 34 has an intermediate groove portion 34a, an upper groove portion 34b, and a lower groove portion 34c. The intermediate groove portion 34a is curved so as to be convex toward the side separating away from the first lateral axis 27. In the present embodiment, the intermediate groove portion 34a is formed so as to have an arc shape centered on the axial center of the first lateral shaft 27 under the state where the guide pin 35 is located in the intermediate groove portion 34a (see FIG. 13). Under the state where the unload lever 31 is in the push-down position (see FIG. 8), the upper groove portion 34b communicates with the upper end portion of the intermediate groove portion 34a, and the lower groove portion 34c communicates with the lower end portion of the intermediate groove portion 34a. In particular, under the state where the unload lever 31 is in the push-down position, the upper groove portion 34b is located on one side (an upper side) of the cam body 33 with respect to the intermediate groove portion 34a and the lower groove portion 34c, has an arcuate shape centering about the axis of the second lateral shaft 32, and extends forward and upward from the upper end portion of the intermediate groove 34a. Further, in this state, the lower groove portion 34c is provided on the other side (a lower side) of the cam body 33 with respect to the upper groove portion 34b and the intermediate groove portion 34a, and is formed so as to extend downward from the lower end portion of the intermediate groove portion 34a. The cam groove 34 is formed in a substantially Z-shape in a side view by the intermediate groove portion 34a, the upper groove portion 34b, and the lower groove portion 34c. The width of the cam groove 34 is slightly larger than the diameter of the guide pin 35 (large enough to allow the guide pin 35 to slide in the cam groove 34) except for a widened portion (a second engaging portion) 34e described later.

As shown in FIG. 10 and the like, the cam body 33 has a first engaging portion 34d and a second engaging portion 34e which are engaging portions for engaging the guide pin 35. The first engaging portion 34d is provided on one end side of the cam groove 34. The second engaging portion 34e is provided on the other end side of the cam groove 34.

The first engaging portion 34d is provided at the upper end portion of the upper groove portion 34b of the cam groove 34. As shown in FIG. 8, the guide pin 35 is engaged to the first engaging portion 34d when the unload lever 31 is in the push-down position. The guide pin 35 is engaged to the first engaging portion 34d by the biasing force of the first biasing member 51, which will be described later.

Figure 14:
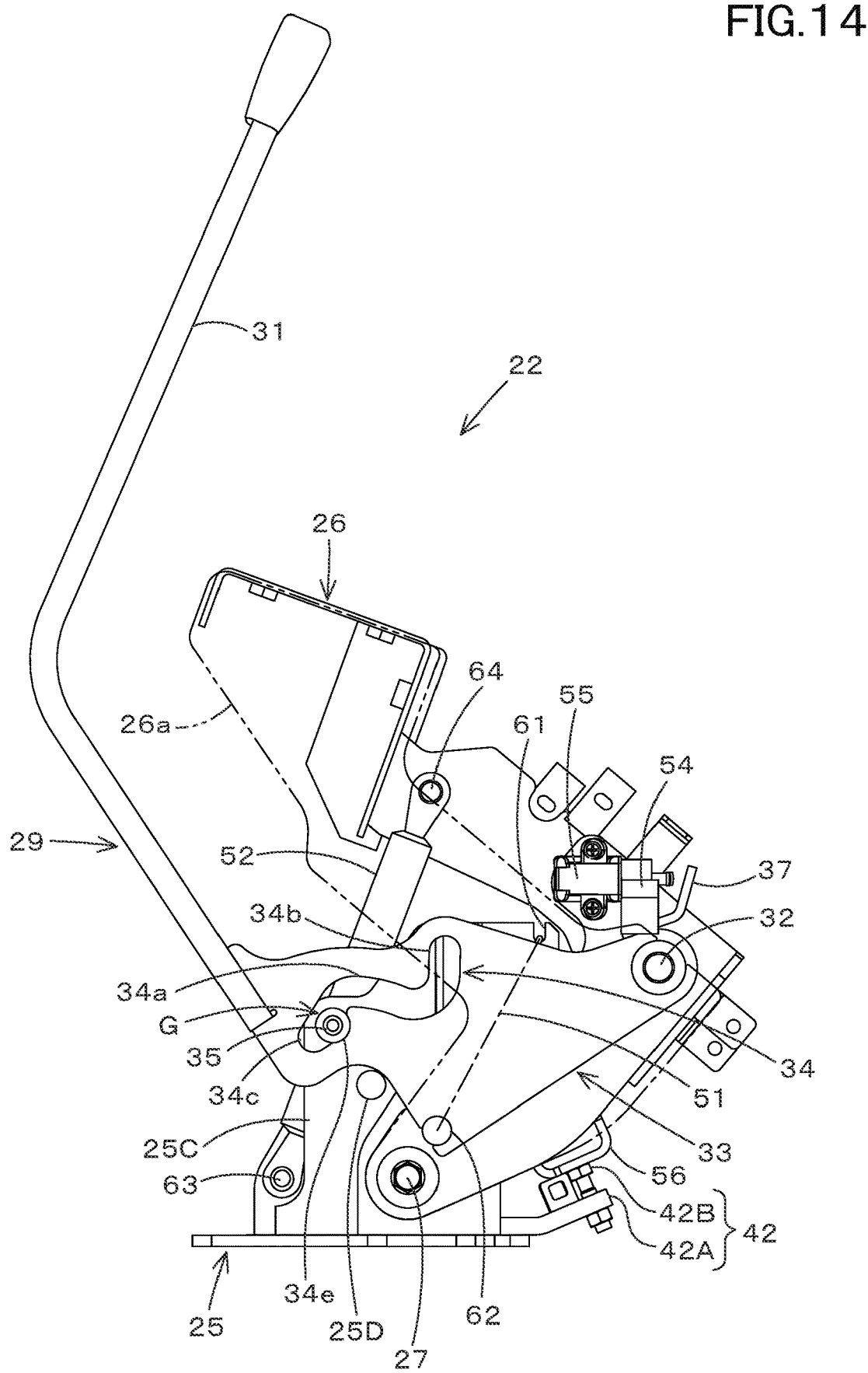
FIG. 14 is a left side view illustrating the unload lever located to the pull-up position according to the embodiment.

As shown in FIG. 8 to FIG. 10, the second engaging portion 34e is provided in the lower groove portion 34c of the cam groove 34. The second engaging portion 34e is constituted of a widened portion formed in the lower groove portion 34c. The widened portion is wider than the other portion of the lower groove portion 34c and the diameter of the guide pin 35, and is formed by expanding the inner edge rear portion of the lower groove portion 34c backward in an arc shape (toward the first lateral axis 27 side). That is, the cam groove 34 has the second engaging portion 34e widened toward the first lateral shaft 27 side on the surface of the lower groove portion 34c on the first lateral shaft 27 side. As shown in FIG. 14, the guide pin 35 is engaged to the second engaging portion 34e when the unload lever 31 is in the push-up position. The engaging of the guide pin 35 to the second engaging portion 34e is also performed by the biasing force of the first biasing member 51. Since the second engaging portion 34e is constituted of the widened portion, a clearance G is formed between the outer periphery of the guide pin 35 and the inner edge (the front edge) of the lower groove portion 34c under the state where the guide pin 35 is engaged to the second engaging portion 34e (see FIG. 14).

Figure 13:
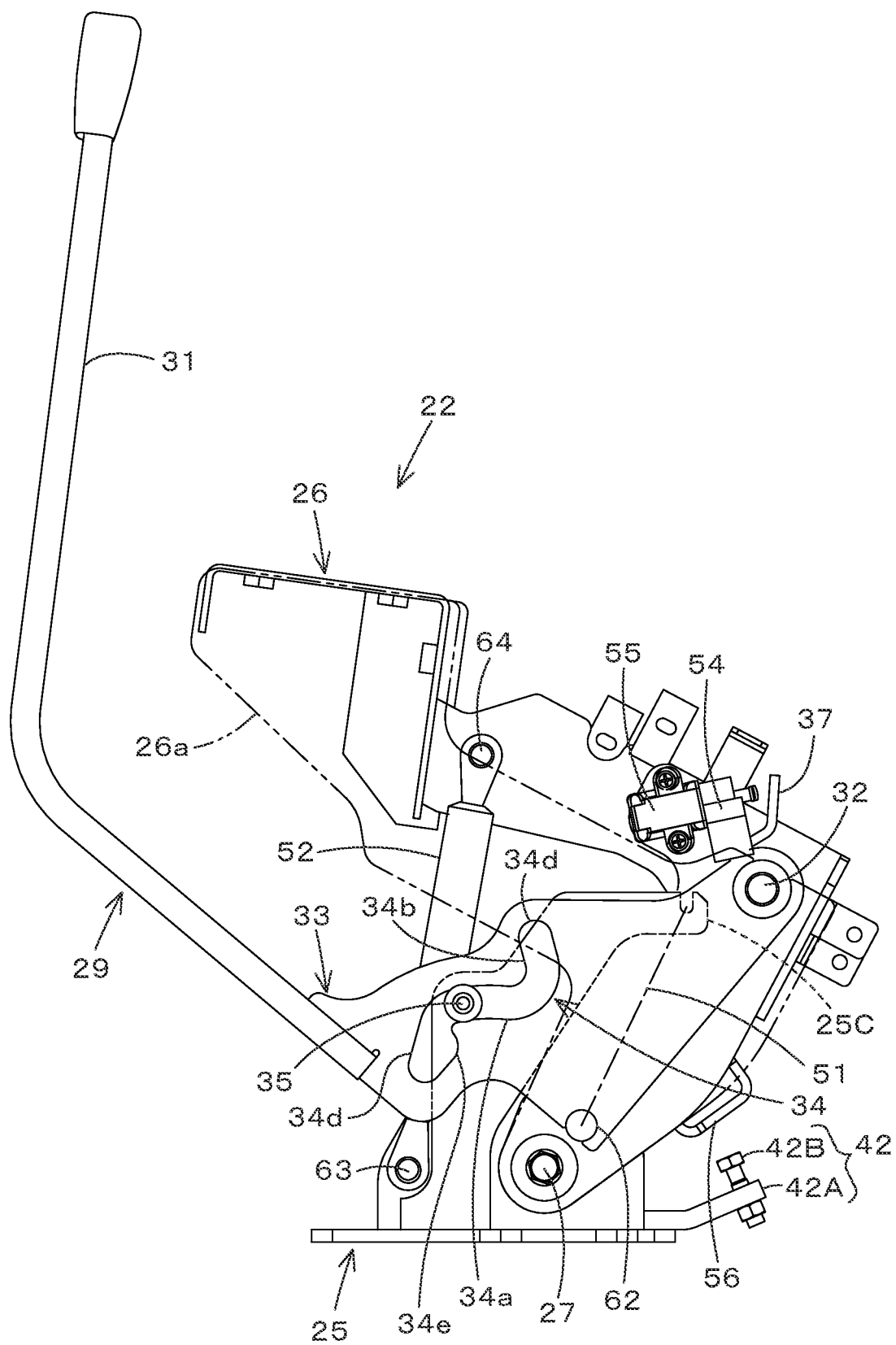
FIG. 13 is a left side view illustrating a state where the unload lever is pulled up to rotate the left operation device upward according to the embodiment.

As shown in FIG. 8, FIG. 13, and FIG. 14 in sequence, when the unload lever 31 is pulled up, the cam body 33 rotates upward with the second lateral shaft 32 as a fulcrum. In accordance with the rotation of the cam body 33, the guide pin 35 relatively moves in the cam groove 34 from the upper groove portion 34b to the lower groove portion 34c through the intermediate groove portion 34a. As shown in FIG. 14, FIG. 13, and FIG. 8 in sequence, when the unload lever 31 is pushed down, the guide pin 35 relatively moves in the cam groove 34 from the lower groove portion 34c to the upper groove portion 34b through the intermediate groove portion 34a. That is, the unload lever 31 can swing between the push-down position where the guide pin 35 is arranged in the upper groove portion 34b and the pull-up position where the guide pin 35 is arranged in the lower groove portion 34c. When the unload lever 31 is in the push-down position (see FIG. 8), the guide pin 35 is located at the first engaging portion 34d provided in the upper groove portion 34b of the cam groove 34. When the unload lever 31 is in the push-up position (see FIG. 14), the guide pin 35 is located in the second engaging portion 34e provided in the lower groove portion 34c of the cam groove 34.

As shown in FIG. 10 and FIG. 11 and the like, a stay 37 is fixed to the upper surface of the rear portion (the base portion) of the cam body 33. The stay 37 is formed in a substantially L-shape in a side view. The upper portion of the stay 37 is configured to contact to a stopper 54 fixed to the upper portion of the left plate member 26a of the control box 26(see FIG. 4, FIG. 6, FIG. 11, and the like). Although the stopper 54 is shown in FIG. 9, the left plate member 26a is omitted.

As shown in FIG. 6, FIG. 8, FIG. 10 and the like, the support bracket 25 and the cam body 33 are connected by the first biasing member 51 constituted of a tension spring. When the unload lever 31 is in the push-down position (see FIG. 8), the first biasing member 51 provides a biasing force to the cam body 33, the biasing force rotating the cam body 33 around the second lateral shaft 32 in a direction in which the unload lever 31 is lowered with respect to the cam body 33. In this manner, the first biasing member 51 engages the guide pin 35 to the first engaging portion 34d with the biasing force applied in the pulling direction. In other words, the first biasing member 51 applies a biasing force that pushes the guide pin 35 to the edge portion (the first engaging portion 34d) of the upper groove portion 34b when the unload lever 31 is in the push-down position. In addition, when the unload lever 31 is in the pull-up position (see FIG. 14), the first biasing member 51 provides a biasing force to the cam body 33 around the second lateral shaft 32 in a direction in which the unload lever 31 is raised with respect to the cam body 33. In this manner, the first biasing member 51 engages the guide pin 35 to the second engaging portion 34e by the biasing force applied in the pulling direction. In other words, the first biasing member 51 applies a biasing force that engages the guide pin 35 to the second engaging portion 34e when the unload lever 31 is in the pull-up position.

Figure 12:
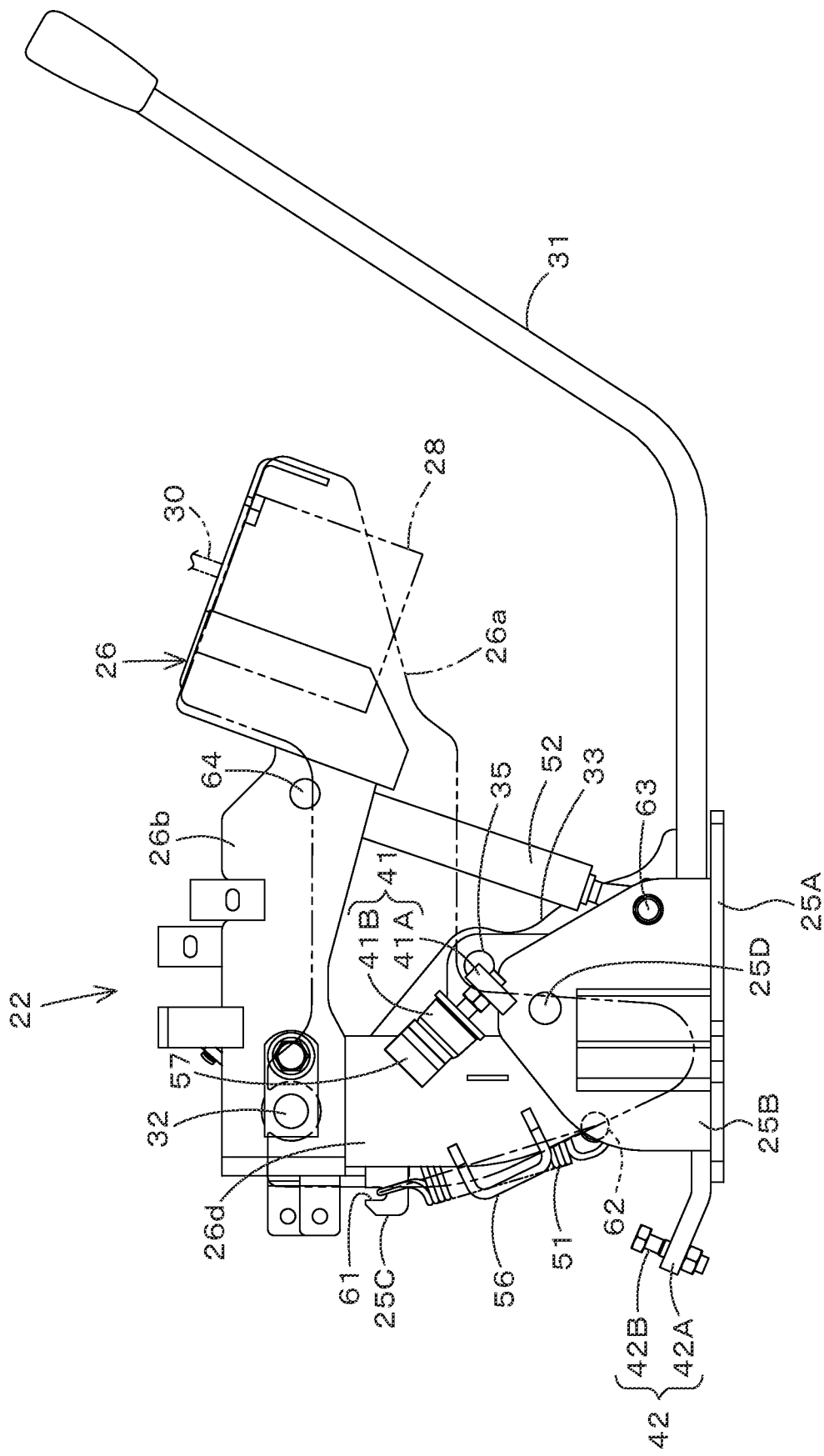
FIG. 12 is a right side view illustrating the inner structure of the left operation device according to the embodiment.

As shown in FIG. 7, FIG. 10, FIG. 12 and the like, the second support portion 25C of the support bracket 25 has a first connector portion 61 that connects the one end portion (the upper end portion) of the first biasing member 51. The first connector portion 61 is provided as a recess portion (a notch) in the rear upper portion of the second support portion 25C. As shown in FIG. 6 and FIG. 10, the cam body 33 has a second connector portion 62 that connects the other end portion (the lower end portion) of the first biasing member 51. The second connector portion 62 is a shaft body fixed to the rear lower portion of the cam body 33, and projects from the cam body 33 to the right (toward the first support portion 25B side). The first connector portion 61 is provided above and behind the second connector portion 62.

As shown in FIG. 8, the first connector portion 61 and the second connector portion 62 are located behind the first lateral shaft 27 and the second lateral shaft 32 under the state where the unload lever 31 is in the push-down position. Thus, the first biasing member 51 connected to the first connector portion 61 and the second connector portion 62 is also located behind the first lateral shaft 27 and the second lateral shaft 32. In addition, the first connector portion 61 and the second connector portion 62 are provided above the first lateral shaft 27 and below the second lateral shaft 32. In other words, the second lateral shaft 32 is arranged above the first connector portion 61 and the second connector portion 62. In addition, the first lateral axis 27 is arranged below the first connector portion 61 and the second connector portion 62. In this manner, the first biasing member 51 is located between the first lateral shaft 27 and the second lateral shaft 32 in the vertical direction. In addition, the second lateral shaft 32, which is a fulcrum of rotation of the cam body 33, is located above the first connector portion 61 and the second connector portion 62.

As shown in FIG. 14, the first connector portion 61 and the second connector portion 62 are located in front of the second lateral shaft 32 when the unload lever 31 is in the pull-up position. Thus, the first biasing member 51 connected to the first connector portion 61 and the second connector portion 62 is also located in front of the second lateral shaft 32.

As shown in FIG. 9 and FIG. 12, the support bracket 25 and the control box 26 are connected by the second biasing member 52 constituted of a gas cylinder (a gas spring). The second biasing member 52 provides a biasing force that rotates the control box 26 around the first lateral shaft 27 in a direction of raising the operation lever (the left operation lever 30). The second biasing member 52 assists the upward rotating operation of the left control device 22 (the control box 26) with use of the biasing force in the stretching direction.

As shown in FIG. 5, FIG. 7, FIG. 10, FIG. 11, and the like, the first support portion 25B of the support bracket 25 has a third connector portion 63 that connects one end portion (the lower end portion) of the second biasing member 52. The third connector portion 63 is a shaft body fixed to the front lower portion of the first support portion 25B, and protrudes leftward from the first support portion 25B (on the second support portion 25C side). The third connector portion 63 is located in front of the first lateral shaft 27. As shown in FIG. 4, FIG. 8, FIG. 9, and the like, the control box 26 has a fourth connector portion 64 that connects the other end portion (the upper end portion) of the second biasing member 52. The fourth connector portion 64 is a shaft body fixed to the front portion of the right plate member 26b of the control box 26, and protrudes leftward from the right plate member 26b.

The widened portion 34e formed in the lower groove portion 34c of the cam groove 34 has a function of facilitating the assembling of the second biasing member 52. In assembling the second biasing member 52, the second biasing member 52 must be assembled while being shortened against the biasing force (the force to stretch). Thus, the second biasing member 52 is assembled in the most stretched state (see FIG. 14) so that the degree of shortening is reduced. In that state, the cam body 33 is positioned being rotated upward and the guide pin 35 is located in the lower groove portion 31c, and thus the widened portion 34e serves as a gap for assembling the second biasing member 52. In this manner, the second biasing member 52 can be easily assembled to.

As shown in FIG. 8 to FIG. 10, and the like, a rotation detector device 55 constituted of a limit switch is provided to an upper portion of the bearing plate 26d of the control box 26. The switching piece provided at the tip end of the rotation detector device 55 is engaged with the stay 37. The rotation detector device 55 is connected to the electronic controller portion of the hydraulic circuit. The electronic controller portion operates an unload valve (not shown in the drawings) provided in the hydraulic circuit according to the detected result of the rotation detector device 55. That is, the unload valve has a state in which the operation fluid outputted from the hydraulic pump can be supplied to each of the hydraulic actuators and a state in which the operation fluid cannot be supplied to each of the hydraulic actuators (a state in which the operation fluid outputted from the hydraulic pump is returned to the operation fluid tank without supplying the fluid to the each of the hydraulic actuators), and is switched between the states depending on the position of the unload lever 31. It should be noted that the present embodiment explains a configuration in which the operation of the unload valve is electronically controlled. However, the configuration of the present embodiment is not limited to that, and the operation of the unload valve may be mechanically switched, for example.

As shown in FIG. 14, when the unload lever 31 is pulled up, the front portion of the cam body 33 rotates upward with the second lateral shaft 32 as a fulcrum, and the stay 37 moves (rotates) backward together with the cam body 33. With the movement of the stay 37, the switching piece of the rotation detector device 55 projects. In this manner, the pulling up of the unload lever 31 (the unloading state) is detected, and the operation of each of the hydraulic actuators is disabled.

As shown in FIG. 11 and FIG. 12, the first support portion 25B of the support bracket 25 is provided with a first contact mechanism 41. The first contact mechanism 41 holds the left control device 22 at a use position described below (see FIG. 8, FIG. 11, and FIG. 12). The first contact mechanism 41 has an attachment plate 41A fixed to the upper portion of the first support portion 25B, and has a first contact member 41B attached to the attachment plate 41A. The first contact member 41B contacts to the first contact plate 57 fixed to the right plate member 26b of the control box 26 when the left control device 22 is placed at the use position.

As shown in FIG. 8 and FIG. 12, a second contact mechanism 42 is provided above the attachment portion 25A of the support bracket 25. The second contact mechanism 42 holds the left control device 22 at an upward-rotating position described below (at an avoiding position) (see FIG. 14). The second contact mechanism 42 has an attachment plate 42A fixed to the rear portion of the attachment portion 25A, and a second contact member 42B attached to the attachment plate 42A. The second contact member 42B contacts to the second contact plate 56 fixed to the left plate member 26a of the control box 26 when the left control device 22 is located at the upward-rotating position (see FIG. 14).

A rotation mechanism 29 configured to rotate the left control device 22 is constituted of the first lateral shaft 27, the cam body 33, the unload lever 31, the rotation detector device 55, the first contact mechanism 41, the second contact mechanism 42, and the like, 29. When the left control device 22 is rotated (retracted) upward by the rotation mechanism 29, the boarding gate 20a provided on the diagonally left front side of the operator seat 8 (that is, the front side of the left control device 22) is secured widely, and thus the left control device 22 does not prevent the operator from getting in and out of the vehicle.

Hereinafter, the rotating operation of the left control device 22 will be described in detail. First, the state in which the unload lever 31 is located at the push-down position and the state in which the unload lever 31 is located at the pull-up position will be respectively described, and thereafter, the operation of the left control device 22 associated with the operation of the unload lever 31 (the push-down operation, the pull-up operation). For simplification of the drawings, only the central axis of the first biasing member 51 and the second biasing member 52 is shown by a chain line in some of the drawings. In addition, some of the members unnecessary for the description are omitted.

<The State where the Unload Lever is Located at the Push-Down Position>

First, the state in which the unload lever 31 is located at the push-down position will be described.

FIG. 8 and FIG. 12 are side views showing the state in which the unload lever 31 is located at the push-down position. The left control device 22 has the use position (a normal operating position) for allowing operation of the working machine 1, which is shown in FIG. 8 and FIG. 12. At this use position, the first contact mechanism 41 restricts the control box 26 from rotating downward around the first lateral axis 27, and the left control device 22 is held at the use position. In particular, the first contact member 41B contacts to the first contact plate 57, so that the left control device 22 is held at the use position.

As shown in FIG. 8, when the left control device 22 is located at the use position, the unload lever 31 is prevented from rotating downward (in the counterclockwise direction in FIG. 8) due to the stay 37 contacting to the stopper 54. The guide pin 35 is located in the upper groove portion 34b of the cam body 33. A biasing force is applied to the cam body 33 by the first biasing member 51 so as to rotate downward (in the counterclockwise direction in FIG. 8) about the second lateral shaft 32. Because of the biasing force applied from the first biasing member 51, the guide pin 35 falls in the state of being engaged to the first engaging portion 34d of the upper groove portion 34b. In this manner, the upward rotation of the cam body 33 is restricted, so that the steering box 26 is prevented from naturally rotating upward due to the biasing force of the second biasing member 52.

At the use position, the unload lever 31 is located at the unload release position, the rotation detector device 55 is turned on, and does not detect the upward rotation of the unload lever 31. Under the state, each of the hydraulic actuators can be operated.

<The State where the Unload Lever is Located at the Pull-Up Position>

Next, the state in which the unload lever 31 is located at the push-up position will be described.

FIG. 14 shows the state in which the unload lever 31 is located at the pull-up position. The left control device 22 (the control box 26) has the upward-rotating position (the avoiding position) that is the state shown in FIG. 14. The left control device 22 is held at the upward-rotating position by the second contact member 42B of the second contact mechanism 42 contacting the second contact plate 56 fixed to the left plate member 26a. At the upward-rotating position, the left control device 22 is retracted rearward from the use position, so that the boarding gate 20a provided on the diagonally left front side of the operator seat 8 (that is, the front side of the left control device 22) is secured widely.

At the upward-rotating position, the unload lever 31 is located at the unload position, the rotation detector device 55 is turned off, and the unload state by the unload lever 31 is detected. Under the state, each of the hydraulic actuators becomes inoperable.

At the upward-rotating position, the guide pin 35 is located in the lower groove portion 34c of the cam body 33. In addition, the biasing force of the first biasing member 51 supplies an biasing force in a direction of rotating the cam body 33 upward about the second lateral shaft 32 (in the clockwise direction in FIG. 14). The biasing force of the first biasing member 51 brings the guide pin 35 into a state of being engaged to the second engaging portion 34e (a locked state). Under the locked state, the guide pin 35 cannot be disengaged from the second engaging portion 34e unless the operator operates the unload lever 31 to rotate the cam body 33. In this manner, even when the operator pushes down a portion other than the unload lever 31 (the left operation lever 30, the control box 26, and the like), it is prevented from shifting to the unload-releasing state (the load state) against the operator's intention.

<Operation of the Left Control Device in Pushing Down the Unload Lever>

To release the locked state from the state shown in FIG. 14, the unload lever 31 is slightly pushed down against the biasing force of the first biasing member 51. In this manner, the cam body 33 rotates downward with the second lateral shaft 32 as a fulcrum. Because of this rotation, the guide pin 35 is disengaged from the second engaging portion 34e and the locked state is released. When the unload lever 31 is further pushed down after releasing the locked state, the cam body 33 rotates downward (in the counterclockwise direction in FIG. 14) around the second lateral shaft 32. In accordance with the rotation of the cam body 33, the guide pin 35 moves relative to the cam body 33, and moves in the cam groove 34 from the lower groove portion 34c to the intermediate groove portion 34a.

As shown in FIG. 13, when the guide pin 35 moves to the intermediate groove portion 34a, the control box 26 is allowed to rotate downward around the first lateral shaft 27 because the intermediate groove portion 34a is formed to have an arc groove centered on the axial center of the first lateral shaft 27, and thus the rotation is started.

When the unload lever 31 is further pushed down from the state of FIG. 13, the cam body 33 rotates further downward around the second lateral shaft 32. In accordance with the downward rotation of the cam body 33, the guide pin 35 moves to the upper end of the upper groove portion 34b and is locked by the first engaging portion 34d. In this manner, the unload lever 31 is located at the push-down position as shown in FIG. 8, and the left control device 22 is located at the use position.

<Operation of the Left Control Device in Pull up the Unload Lever>

When the unload lever 31 is pulled up against the biasing force of the first biasing member 51 from the state where the unload lever 31 is located at the push-down position as shown in FIG. 8, the cam body 33 rotates upward about the second lateral shaft 32 (in the clockwise direction in FIG. 8). In accordance with the rotation of the cam body 33, the guide pin 35 moves relative to the cam body 33, and moves in the cam groove 34 from the upper groove portion 34b to the intermediate groove portion 34a. As shown in FIG. 13, when the guide pin 35 moves to the intermediate groove portion 34a, the intermediate groove portion 34a is formed to have an arc groove centered on the axial center of the first lateral shaft 27. Thus, the upward rotation of the control box 26 around the first lateral shaft 27 is allowed, and then the rotation starts.

When the unload lever 31 is further pulled up from the state of FIG. 13, the cam body 33 rotates further upward around the second lateral shaft 32. In accordance with the upward rotation of the cam body 33, the guide pin 35 moves from the intermediate groove portion 34a to the lower groove portion 34c, and is engaged to the second engaging portion 34e. In this manner, as shown in FIG. 14, the unload lever 31 is located at the pull-up position, and the left control device 22 is located at the upward-rotating position (the avoiding position).

In the process of operation to pull up the unloading lever 31, the second biasing member 52 applies, to the control box 26, a biasing force in the extending direction, and thereby assisting the operation to rotate the control box 26 upward about the first lateral axis 27.

As described above, the lever device (the left control device 22) according to the embodiment, includes: the base pedestal (the support bracket 25); the movable body (the control box 26) pivotally supported by the base pedestal to be rotatable about the first lateral shaft 27; the lever (the unload lever 31) supported by the movable body to be swingable; the cam body 33 having the cam groove 34, pivotally supported by the movable body to be rotatable about the second lateral shaft 32 and configured to rotate about the second lateral shaft 32 according to the swinging of the lever; the guide pin 35 provided on the base pedestal and inserted to the cam groove 34; and the first biasing member 51 configured to press the cam body 33 in a direction to rotate the cam body 33 about the second lateral shaft 32. The cam groove 34 includes: the intermediate groove portion 34a curved to be convex in a direction separating from the first lateral shaft 27; the upper groove portion 34b communicated with an upper end portion of the intermediate groove portion 34a and curved in the direction separating from the first lateral shaft 27; and the lower groove portion 34c communicated with a lower end portion of the intermediate groove portion 34a and curved in the direction approaching the first lateral shaft 27. The lever is configured to swing between: the push-down position at which the guide pin 35 is arranged in the upper groove portion 34b; and the pull-up position at which the guide pin 35 is arranged in the lower groove portion 34c. The cam groove 34 is provided in the cam body 33 in front of the second lateral shaft 32. The first biasing member 51 has: one end connected to the first connector portion 61 provided on the base pedestal; and the other end connected to the second connector portion 62 provided on the cam body 33, is arranged behind the second lateral shaft 32 when the lever is located at the push-down position, and is arranged in front of the second lateral shaft 32 when the lever is located at the pull-up position.

According to the configuration described above, when the lever device is located at the push-down position, the first biasing member 51 is arranged rearward of the second lateral shaft 32, which is the pivotal fulcrum of the lever. Thus, the guide pin 35 is pressed against the edge portion of the upper groove portion 34b by the biasing force of the first biasing member 51 to prevent the cam body 33 from rotating upward. In this manner, the cam body 33 cannot be rotated upward unless the lever device is operated, so that it is possible to prevent the movable body from rotating unintentionally upward. In addition, when the lever is located at the pull-up position, the first biasing member 51 is arranged in front of the second lateral shaft 32, which is the pivotal fulcrum of the lever, so that the biasing force of the first biasing member 51 engages the guide pin 35 to the lower groove portion 34c, and thereby the downward rotation of the cam body 33 is prevented. In this manner, the cam body 33 cannot be rotated downward unless the operator operates the lever. Thus, the operator is prevented from carelessly pushing down the portions other than the lever (the control box 26, the left operation lever 30, and the like), and thus it is possible to prevent the position of the lever from being switched by the pushing down. In addition, the lever device having a lever configured to be swung between the push-down position and the pull-up position can be realized with a smaller number of parts than that of the conventional lever device, so that the manufacturing cost can be reduced. In addition, since the number of connector portions between the members can be reduced as compared with the number of connector portions of the conventional lever device, the amount of backlash at the lever tip end can be reduced, and the operability can be improved. Moreover, since the first biasing member 51 can be assembled behind the first lateral shaft 27 and the second lateral shaft 32, the assembly difficulty of the first biasing member 51 can be improved.

In addition, the second lateral shaft 32 is arranged above the first connector portion 61 and the second connector portion 62.

According to the configuration described above, since the distance between the first connector portion 61 and the second connector portion 62 can be increased, the degree of freedom in size of the first biasing member 51 is increased. In this manner, when the first biasing member 51, for example, is formed of a spring, it is possible to extend the life of the spring by increasing the number of wiring turns.

In addition, the first lateral shaft 32 is arranged below the first connector portion 61 and the second connector portion 62.

According to the configuration described above, the first biasing member 51 is arranged above the first lateral shaft 27 and below the second lateral shaft 32. Thus, when the movable body rotates around the first lateral shaft 27, the first biasing member 51 can be moved to a position rearward of and a position forward of the second lateral shaft 32, which is the rotation fulcrum of the lever. In this manner, the biasing direction of the first biasing member 51 can be changed depending on whether the lever is located at the push-down position or at the pull-up position.

In addition, the cam groove 34 has the engaging portion (the second engaging portion 34e) that is widened toward the first lateral shaft 27 side on the surface of the lower groove portion 34c provided on the first lateral shaft 27 side, and the guide pin 35 is engaged to the engaging portion when the lever is located at the pull-up position.

According to the configuration described above, when the lever is located at the pull-up position, the guide pin 35 can be engaged to the engaging portion (the second engaging portion 34e) provided in the lower groove portion 34c by the biasing force of the first biasing member 51. Thus, the cam body 33 can be prevented from rotating downward. In this manner, the operator is prevented from carelessly pushing down the portions other than the lever, and thus it is possible to prevent the position of the lever from being switched by the pushing down.

In addition, the first biasing member 51 provides a biasing force to pushes the guide pin 35 to the edge portion of the upper groove portion 34*b* when the lever is located at the push-down position, and provides a biasing force to engage the guide pin 35 to the engaging portion when the lever is located at the pull-up position.

According to the configuration described above, it is possible to more reliably prevent the position of the lever from being switched due to the operator inadvertently pushing down a portion other than the lever.

In addition, the first biasing member 51 provides a biasing force for rotating the cam body 33 in the direction in which the lever is lowered when the lever is located at the push-down position, and provides a biasing force for rotating the cam body 33 in the direction in which the lever is raised when the lever is located at the pull-up position.

According to the configuration described above, it is possible to more reliably prevent the position of the lever from being switched due to the operator inadvertently pushing down a portion other than the lever.

In addition, the lever device includes the second biasing member 52 connecting the base pedestal and the movable body, and is configured to provide an biasing force for rotating the movable body in a direction of raising the movable body around the first lateral axis 27.

According to the configuration described above, the biasing force of the second biasing member 52 can easily perform the operation to rotate the movable body upward about the first lateral axis 27.

The working machine 1 according to the present embodiment includes the lever device (the left control device 22) described above.

According to the configuration described above, it is possible to realize the working machine 1 including the lever device that is inexpensive and has good operability.

In addition, the working machine 1 includes the operator seat 6, the hydraulic actuator, and the lever device arranged on the side of the operator seat 6, and the lever is the unload lever 31 configured to switch the hydraulic actuator between the operable state and the inoperable state.

According to the configuration described above, it is possible to realize the working machine 1 including the unload lever 31 that is inexpensive and has good operability.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A lever device comprising:
a base pedestal;
a movable body pivotally supported by the base pedestal to be rotatable about a first lateral shaft;
a lever supported by the movable body to be swingable;
a cam body having a cam groove, pivotally supported by the movable body to be rotatable about a second lateral shaft and configured to rotate about the second lateral shaft according to swinging of the lever;
a guide pin provided on the base pedestal and inserted to the cam groove; and
a first biasing member configured to press the cam body in a direction to rotate the cam body about the second lateral shaft,
wherein the cam groove includes:
an intermediate groove portion curved to be convex in a direction separating from the first lateral shaft;
an upper groove portion communicated with an upper end portion of the intermediate groove portion and curved in the direction separating from the first lateral shaft; and
a lower groove portion communicated with a lower end portion of the intermediate groove portion and curved in the direction approaching the first lateral shaft,
wherein the lever is configured to swing between:
a push-down position at which the guide pin is arranged in the upper groove portion; and
a pull-up position at which the guide pin is arranged in the lower groove portion,
wherein the cam groove is provided in the cam body in front of the second lateral shaft,
and wherein the first biasing member has: one end connected to a first connector portion provided on the base pedestal; and the other end connected to a second connector portion provided on the cam body, is arranged behind the second lateral shaft when the lever is located at the push-down position, and is arranged in front of the second lateral shaft when the lever is located at the pull-up position.

2. The lever device according to claim 1,
wherein the second lateral shaft is arranged above the first connector portion and the second connector portion.

3. The lever device according to claim 2,
wherein the first lateral shaft is arranged below the first connector portion and the second connector portion.

4. The lever device according to claim 1,
wherein the cam groove has
an engaging portion provided on a surface of the lower groove portion on the first lateral shaft side and having a width expanded to the first lateral shaft side,
and wherein the guide pin is engaged with the engaging portion when the lever is located at the pull-up position.

5. The lever device according to claim 4,
wherein the first biasing member provides a biasing force for pushing the guide pin to an edge portion of the upper groove portion when the lever is located at the push-down position, and provides a biasing force for engaging the guide pin with the engaging portion when the lever is located at the pull-up position.

6. The lever device according to claim 1,
wherein the first biasing member provides a biasing force to the cam body to rotate the cam body in a direction to lower the lever when the lever is located at the push-down position, and provides a biasing force to the cam body to rotate the cam body in a direction to raise the lever when the lever is located at the pull-up position.

7. The lever device according to claim 1, comprising
a second biasing member configured to provide a biasing force for connecting the base pedestal and the movable body and rotating the movable body in a direction to raise the movable body around the first lateral shaft.

8. A working machine comprising
the lever device according to claim 1.

9. The working machine according to claim 8, comprising:
an operator seat;
a hydraulic actuator; and
the lever device arranged beside the operator seat,
wherein the lever is an unload lever configured to switch the hydraulic actuator between an operable state and an un-operable state.

* * * * *